(12) United States Patent
Conley et al.

(10) Patent No.: US 6,261,026 B1
(45) Date of Patent: Jul. 17, 2001

(54) RESILIENTLY MOUNTED CLIP FOR INDEXED POLES

(75) Inventors: Christopher V. Conley; Scott A. Ternovits, both of Chicago, IL (US)

(73) Assignee: Gravity Tank, Inc., Chicago, IL (US)

(*) Notice: Subject to any disclaimer, the term of this patent is extended or adjusted under 35 U.S.C. 154(b) by 0 days.

(21) Appl. No.: 09/345,008

(22) Filed: Jul. 2, 1999

(51) Int. Cl.[7] ............................... B25G 3/36; E04G 7/00; F16B 7/00
(52) U.S. Cl. ............................... 403/397; 403/65; 16/252
(58) Field of Search ............................... 403/397, 326, 403/329, 321, 322.1, 325, 13, 14, 65; 24/336; 16/252, 253

(56) References Cited

U.S. PATENT DOCUMENTS

| | | | |
|---|---|---|---|
| 2,760,674 | 8/1956 | Karp | 220/55 |
| 2,888,725 | 6/1959 | Cudd | 24/84 |
| 3,119,163 | 1/1964 | Merfeld | 24/255 |
| 3,589,758 | 6/1971 | King | 287/189.35 |
| 3,596,427 | 8/1971 | Fernandez et al. | 248/357 |
| 3,604,369 | 9/1971 | Maslow | 108/144 |
| 3,781,944 | 1/1974 | Gianardi | 16/187 |
| 4,121,798 | 10/1978 | Schumacher et al. | 248/113 |
| 4,688,961 | * 8/1987 | Shioda et al. | 403/389 |
| 4,706,576 | 11/1987 | James | 108/111 |
| 4,774,792 | 10/1988 | Ballance | 52/282 |
| 4,785,565 | 11/1988 | Kuffner | 40/605 |
| 4,936,530 | * 6/1990 | Wollar | 248/71 |
| 4,968,171 | 11/1990 | Shell | 403/4 |
| 4,993,126 | 2/1991 | Collins | 24/336 |
| 5,178,479 | * 1/1993 | Brown et al. | 403/13 |
| 5,371,991 | * 12/1994 | Bechtel et al. | 52/686 |
| 5,582,488 | * 12/1996 | Dudley et al. | 403/103 |
| 5,943,834 | * 8/1999 | Jeffers et al. | 52/239 |

* cited by examiner

Primary Examiner—Lynne H. Browne
Assistant Examiner—John B. Walsh
(74) Attorney, Agent, or Firm—Marshall, O'Toole, Gerstein, Murray & Borun

(57) ABSTRACT

A clip for mounting panels and doors to indexed poles utilizes a resilient C-shaped pole receiving member with an interiorly-directed ridge centrally located along the inner perimeter thereof. The interiorly-directed ridge is received in any desired unoccupied annular groove along the indexed pole. The clip further utilizes first and second opposing panel interface members that extend in one direction from the exterior of the C-shaped pole-receiving member. A raised button or projection extending from a first panel interface member toward a second panel interface member may be provided to secure a panel between the two panel interface members. Use of the clip allows mounting and dismounting of panels to indexed poles, such as the indexed poles found in shelf organizing systems, without the need for tools. By utilizing clips along only a single edge of a panel, each of the clips can serve as a hinge and the panel as a door member.

17 Claims, 3 Drawing Sheets

RESILIENTLY MOUNTED CLIP FOR INDEXED POLES

BACKGROUND OF THE INVENTION

1. Field of the Invention

This invention relates generally to mounting devices and, more specifically, to a clip that is resiliently secured to an indexed pole for securely mounting a panel to the indexed pole.

2. Description of the Related Art

A desirable feature of closet organizing systems and other shelf systems for the home or office is their ease of assembly. One way to facilitate assembly is to provide components that can be assembled with little or no use of tools. Another desirable feature of these systems is their adjustability. For example, an increasingly popular organizing system includes shelf members that are mounted at selected locations along indexed poles. Each pole includes annular grooves at spaced intervals along the pole's entire length. At each corner of the shelf members, a generally circular pole interface member is provided. Each of the circular pole interface members has an integral, inwardly-directed ridge that is received in a desired one of the annular grooves to secure the shelf member at a desired height along the indexed pole.

In order to increase the versatility of such organizing systems that utilize indexed poles, it would be desirable to provide a means for securing wall and door panels to the indexed poles. It would be further desirable for such panels to be easy to install or remove without the need for any tools. The manner in which these and other objects of the present invention are achieved is explained in the following Brief Summary of the Invention, the Drawings, and the Detailed Description of the Invention.

BRIEF SUMMARY OF THE INVENTION

The resilient clip of the present invention utilizes a generally C-shaped pole receiving member formed of a resilient material that clips to an indexed pole having annular grooves at spaced intervals thereof. The C-shaped pole receiving member of the resilient clip has an interior and an exterior, with an interiorly-directed ridge centrally located therein extending along the inner perimeter of the C-shaped pole receiving member. When the C-shaped pole receiving member is clipped to an indexed pole, the inwardly-directed ridge is received in one of the annular grooves along the indexed pole, thereby desirably preventing axial movement of the resilient clip along the indexed pole.

The C-shaped pole receiving member is integral with a pair of generally parallel panel interface members that extend in one direction from the exterior of the pole receiving member. These panel interface members are spaced a short distance from one another and are provided with means for securing a panel therebetween.

In a preferred embodiment, the panel securement means takes the form of a raised button or projection extending from a first of the panel interface members toward the second panel interface member. A corresponding recess is provided in the second panel interface member to receive the projection. Each portion of the panel mounted to an indexed pole using the clip is preferably adapted with a hole spaced from an outer edge of the panel and sized to securely receive the projection. By sliding the panel between the panel interface members, the projection rides along one surface of the panel until the hole allows the projection to pass through the panel, thereby securing the panel between the two panel interface members.

Although the inwardly-directed ridge of the C-shaped pole receiving member, when received in one of the annular grooves, prevents axial movement of the clip, the clip can still be rotated about the indexed pole. Thus, by providing clips of the present invention along only a single edge of a panel, each of the resilient clips advantageously serves as a hinge and the panel can serve as a door. Alternatively, to prevent hinged movement of a panel about an indexed pole, clips of the present invention can be provided along more than one edge of the panel and can be used to secure the panel to, for example, two parallel indexed poles. The clips can readily increase the versatility of organizing systems or various other contemporary furniture assemblies that utilize indexed poles.

DETAILED DESCRIPTION OF THE INVENTION

Figure 1:
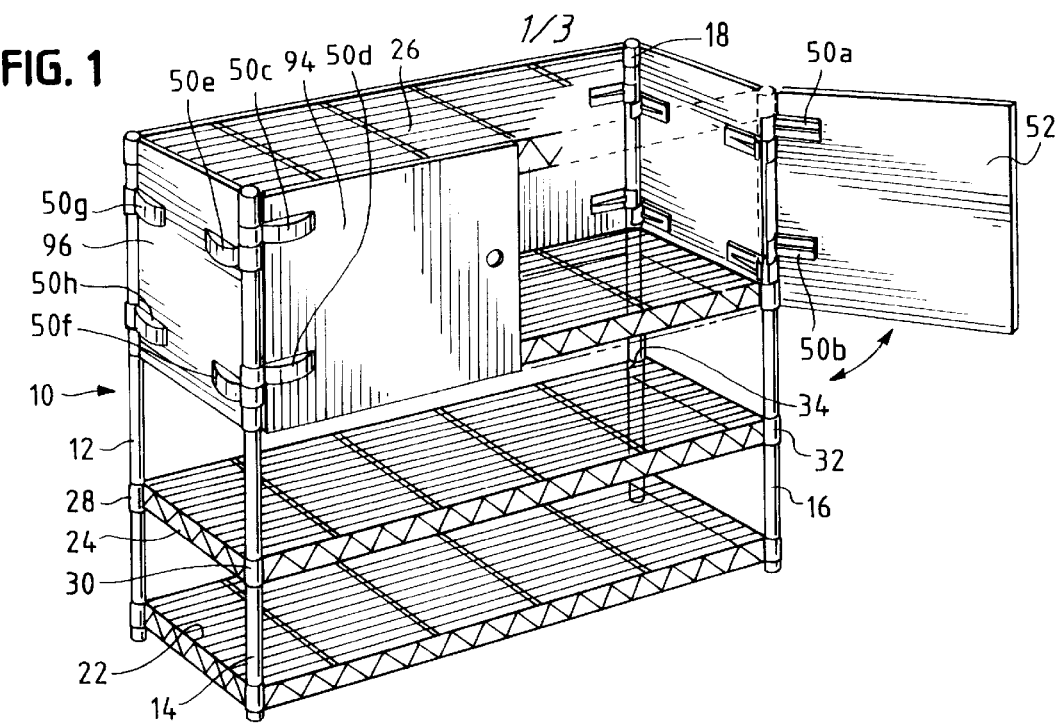
FIG. 1 is an environmental view of an organizing system including clips of the present invention.
Figure 2:
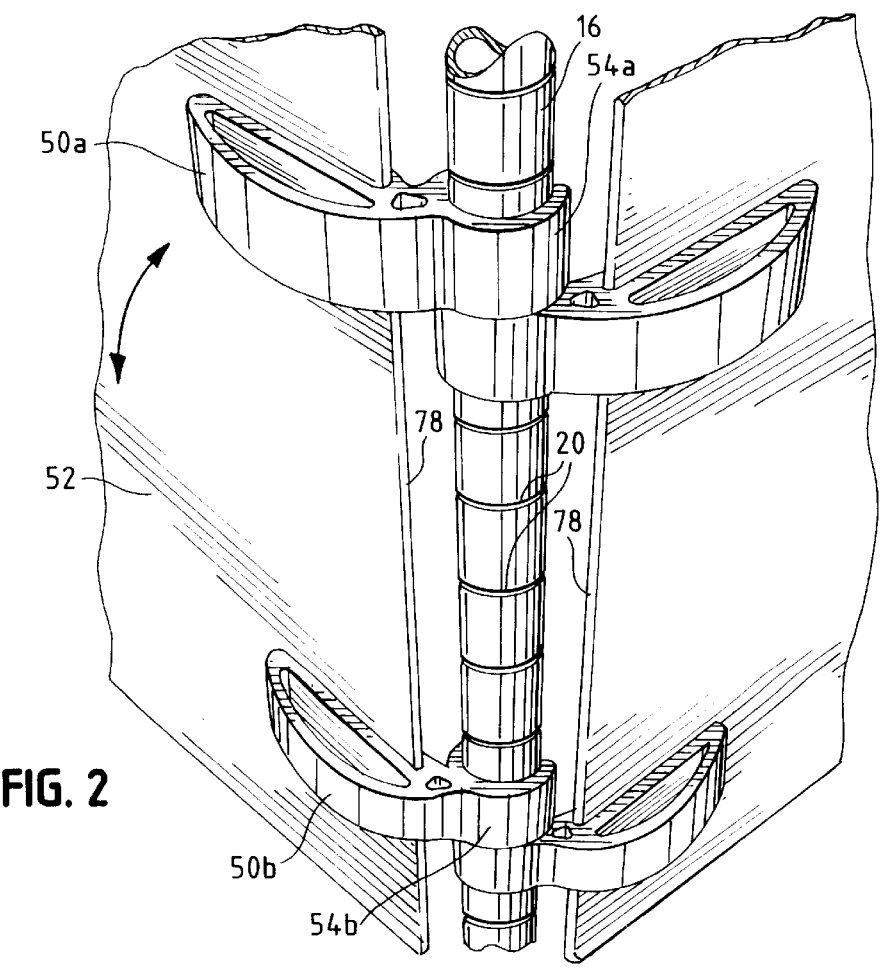
FIG. 2 is a perspective view, broken away, of an indexed pole of the organizing system of FIG. 1, showing four clips of the present invention.

As shown in FIGS. 1 and 2, an organizing system 10 utilizes indexed poles 12, 14, 16 and 18 as vertical supports. Each indexed pole 12–18 includes annular grooves 20 at regularly-spaced intervals along its entire length. These annular grooves 20 provide adjustability to the organizing system 10 by allowing the assembler to mount horizontal shelves 22, 24, 26 at selected heights of the indexed poles 12–18. Organizing systems that utilize indexed poles as vertical supports for mounting shelves are conventional. In such organizing systems, a ring-like connector 28, 30, 32, 34 is provided at each corner of the shelf. Each ring-like connector, e.g., rink-like connector 32, is comprised of two complementary interlocking pieces (not shown) that engage an annular groove 20 of a corresponding indexed pole 16 at a selected height. Each corner of the horizontal shelves 22, 24, 26 is provided with a cylindrical opening that slidingly engages one of the ring-like connectors, e.g. ring-like connector 32, which locks the ring-like connector 32 to the indexed pole and secures the horizontal shelf 24 in place. The remaining corner ring-like connectors 28, 30, and 34 of the shelf are locked in a similar fashion in annular grooves 20 at the same height of the other indexed poles 12, 14, and 18 by being slidingly engaged by cylindrical openings at the other corners of the shelf to ensure the shelf lies flat, i.e., forms a horizontal plane.

Thus, an assembler must perform several operations to install a shelf on such an organizing system 10, including installing each two-piece ring-like connector 28, 30, 32, 34 at a desired location along the indexed poles and sliding each cylindrical corner of the shelf, e.g. shelf 24, into engagement with each of the two-piece ring-like connectors 28–34.

Advantageously, the remaining annular grooves 20 provide many convenient locations to mount panels to the organizing system 10. Turning to FIGS. 3–7, the resilient clip 50 of the present invention provides a component for mounting a panel 52 to an indexed pole 14, which vastly increases the versatility of organizing systems and other furniture assemblies that utilize indexed poles. When using the resilient clip 50, no tools are necessary to install the panel 52 onto the indexed pole 14. In addition, the clip 50 can be installed directly at its desired location along the indexed pole, rather than having to slide the C-shaped pole receiving member 54. from one end of the indexed pole to its desired location, which was required when mounting the horizontal shelves. In addition, the resilient clip 50 is advantageously a unitary, i.e., one-piece, securement member. Thus, installation of the resilient clip 50 onto the indexed poles of an organizing system is much easier than installation of the shelves and two-piece ring-like connectors.

Figure 4:
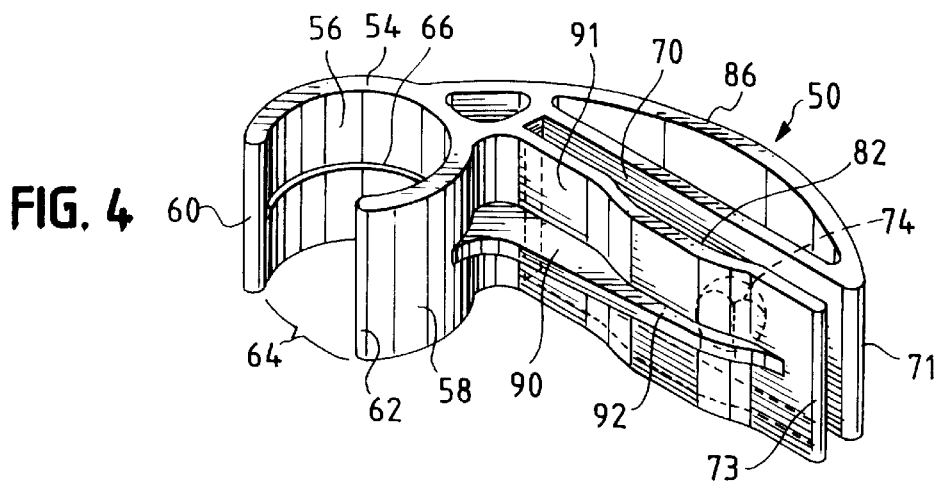
FIG. 4 is a perspective view of the clip of the present invention.
Figure 5:
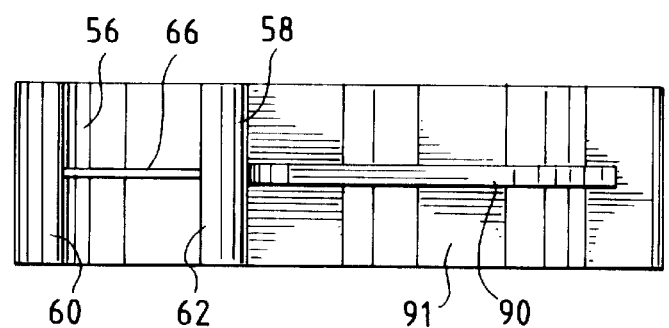
FIG. 5 is a front plan view of the clip shown in FIG. 4.
Figure 6:
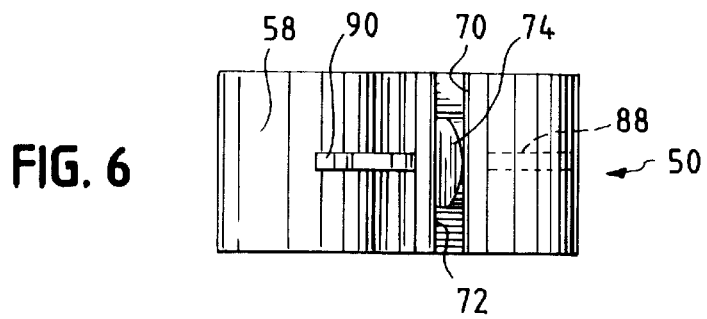
FIG. 6 is a right side view of the clip shown in FIG. 4.
Figure 7:
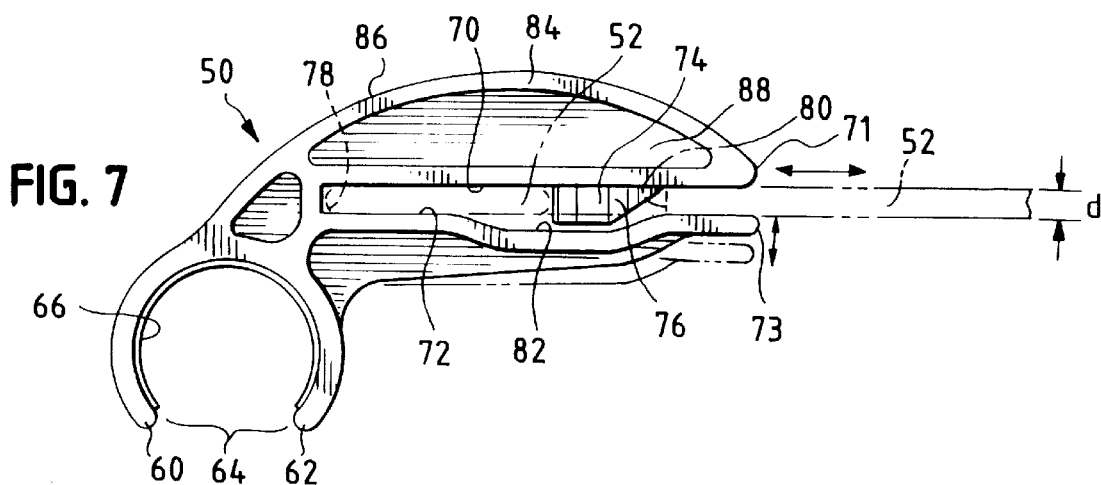
FIG. 7 is a top plan view of the clip shown in FIG. 4, with broken lines demonstrating the insertion of a panel (in cross-section) between the panel interface members of the clip.

As shown in FIG. 4, the resilient clip 50 includes a generally C-shaped pole receiving member 54 having an interior 56 and an exterior 58. The C-shaped pole receiving member 54 includes a first edge 60 and a second edge 62, which define a mouth portion 64 to allow the C-shaped pole receiving member 54 to clip onto the indexed pole 14. An inwardly-directed, centrally located ridge 66 extends along the interior 56 of the C-shaped pole receiving member 54, substantially from the first edge 60 to the second edge 62. When the clip 50 is installed, the ridge 66 is securely received within one of the annular grooves 20 of the indexed pole 14 to prevent the resilient clip 50 from moving axially along the indexed pole 16.

When the indexed pole 16 is first received within the C-shaped pole receiving member 54, it may be the case that the ridge 66 is not aligned with any of the annular grooves 20. In such cases, one simply slides the clip 50 axially along the indexed pole 16 until the ridge 66 engages a desired annular groove 20 to secure the clip 50 in a desired location along the indexed pole 14.

Figure 3:
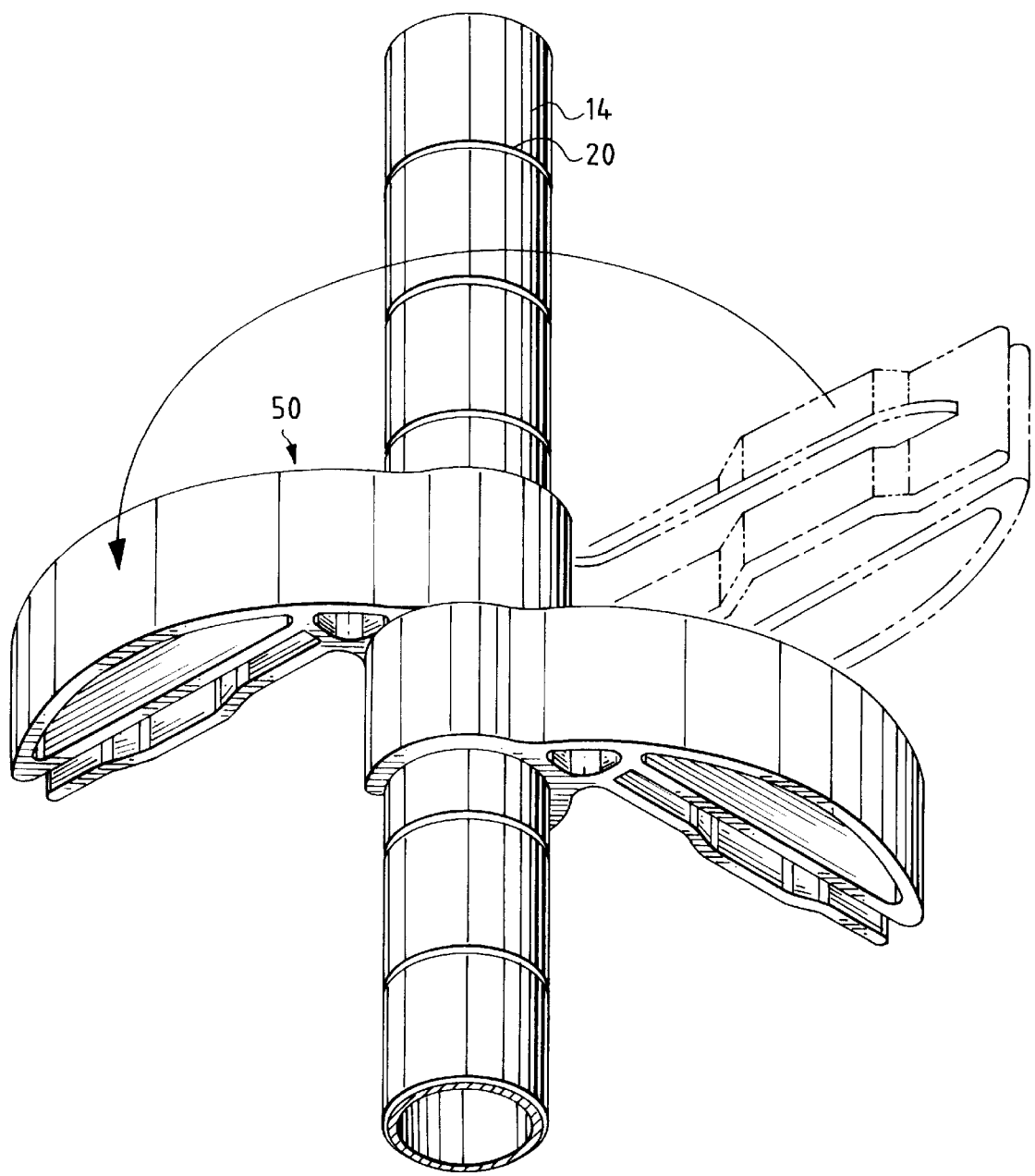
FIG. 3 is a perspective view of an indexed pole showing a pair of clips of the present invention, with broken lines demonstrating that the clips are rotatable about the indexed pole.

As represented by the broken lines and the arcuate directional arrow in FIG. 3, the clip 50 is rotatable about the indexed pole 14 even when the ridge 66 is received in one of the annular grooves 20 to prevent axial movement of the clip 50. As explained in greater detail below, this feature allows the clip 50 to serve as a hinge member when clips are provided along only a single edge of a panel 52 secured to the indexed pole 16.

A pair of integral panel interface members 70, 72 extend perpendicularly to the axis defined by the C-shaped pole receiving member 54 of the clip 50. The first panel interface member 70 is parallel to, and spaced a short distance d from the second panel interface member 72 to provide clearance for the panel 52 therebetween. The first panel interface member 70 has a distal end 71 and the second panel interface member has a distal end 73, and these distal ends 71, 73 define an entrance to a slot defined by the gap between the first and second panel interface members 70, 72 to receive the panel 52. A means for securing the panel 52 between the panel interface members 70, 72 is also provided, taking the form of a raised button or projection 74 extending from the first panel interface member 70 in the direction of the second panel interface member 72.

The projection 74 is preferably provided with an inclined leading edge 76 that slopes downwardly toward the entrance defined by distal ends 71, 73 of the panel interface members 70, 72. This inclined leading edge 76 facilitates insertion of the panel 52 over the projection 74 because once the outer edge 78 of the panel 52 contacts the sloped leading edge 76, the panel 52 rides up the inclined leading edge 76 and over the projection 74. The second panel interface member 72 is resiliently adapted to bend slightly outwardly, i.e. away from the first panel interface member 70 during installation of the panel 52, as shown in broken lines in FIG. 7, to accommodate the panel 52 passing over the projection 74. Thus, because of the unitary resilient clip 50 of the present invention, mounting a panel 52 onto the indexed pole 16 can favorably be accomplished without the use of tools.

Dismounting a panel 52 from the indexed pole 16 is also accomplished without tools, simply by removing the panel 52 from between the first and second panel interface members. To facilitate removal of the panel 52, a user also has the option of first unclipping each of the resilient clips 50 associated with the panel 52 from the indexed pole 16.

The panel 52 preferably includes an aperture 80 therein that is spaced from the outer edge 78 of the panel 52. The aperture 80 allows the projection 74 to pass through the panel 52. Once the aperture 80 is aligned with the projection 74, the second panel interface member 72 snaps back to its original position, thereby securing the panel 52 in place within the clip 50. In order to accommodate the projection 74, the second panel interface member 72 is provided with a recessed area 82 directly opposite the projection 74. The recessed area 82 is preferably contoured, as opposed to having sharp right-angled corners, to further facilitate installation of the panel 52.

An arcuate wall member 84 adjoins the first panel interface member 70. The arcuate wall member 84 is located on the opposite side of the first panel interface member 70 from the projection 74. The arcuate wall member 84 extends from the exterior 58 of the C-shaped pole receiving member to the distal end 71 of the first panel interface member 70. The first panel interface member 70 and the arcuate wall member 84 cooperate to form a D-shaped first leg 86 of the clip 50. The D-shaped first leg 50 may be provided with a webbed interior wall 88. The D-shaped first leg 86 is sufficiently stiff to substantially avoid unwanted flexing and rotation during insertion of a panel member 52 into the clip 50.

A webbed flange 90 extends between an outer side 91 of the second panel interface member 72 and the exterior 58 of the C-shaped pole receiving member 54. As the panel 52 passes over the projection 74 on the first panel interface member 70, the webbed flange 90 serves to bias the second panel interface member 72 toward its original location, i.e. back toward the first panel interface member 70. The webbed flange 90 and the second panel interface member 72 together form a second leg 92 of the clip 50. The webbed flange 90 extends along a substantial portion of the outer side 91 of the second panel interface portion and terminates between the recess 82 and the distal end 73. Both the webbed interior wall 88 of the D-shaped first leg 86 and the webbed flange 90 of the second leg 92 are preferably co-planar with the ridge 66, i.e., in a plane that bisects the clip 50.

As shown in FIGS. 1 and 2, a panel 52 is secured in place within a first clip 50*a* of the present invention and a second identical clip 50*b*. Both clips 50*a*, 50*b* are secured within annular grooves 20 along the indexed pole 16, thereby preventing the panel 52 from moving axially along the indexed pole 16. When clips 50a, 50b are provided along only a single edge 78 of a panel 52, the panel 52 is able to rotate about the indexed pole 16, with the C-shaped pole receiving members 54a and 54b of the respective clips 50a, 50b acting as hinges. In FIG. 1, panel 94 is mounted with clips 50c and 50d along only one panel edge, and therefore panel 94 is also able to rotate about the indexed pole 14. FIG. 1 thus demonstrates the use of panels 52 and 94 in combination with the clips 50a–50d to form doors for the organizing system 10.

Panel 96 is shown in combination with clips 50e and 50f along one edge of the panel 96, and with clips 50g and 50h along an opposite edge. With all four clips 50e, 50f, 50g and 50h secured in annular grooves 20 of indexed poles 12 and 14, the panel 96 is prevented from moving axially relative to, and from rotating about, either indexed pole 12 or 14. By providing clips in combination with a panel 96 along more than one edge, the panel 96 forms a stationary wall of the organizing system 10. Although all of the indexed poles 12, 14, 16 and 18 are shown vertically oriented, it is recognized that the clip 50 of the present invention is equally effective when used with indexed poles mounted horizontally or in any other orientation.

While the clip of the present invention has been shown with respect to a most preferred embodiment thereof, it is recognized that various changes can be made thereto that are within the scope of the appended claims.

We claim:

1. A clip for mounting panels to an indexed pole comprising:
   a substantially C-shaped resilient pole interface member having an interior, an exterior, first and second ends defining an opening to receive said indexed pole, and an intermediate inwardly-directed ridge extending substantially from said first end to said second end on the interior of the pole interface member; and
   a pair of integral, generally parallel panel interface members extending in a first direction from the exterior of said pole interface member and each of the panel interface members terminating at a distal end opposite said pole interface member, said panel interface members including means for lockingly engaging a panel therebetween.

2. The clip of claim 1, in combination with an indexed pole including a plurality of spaced grooves, wherein said inwardly-directed ridge is received in one of said grooves, whereby said clip is prevented from axial movement along said indexed pole.

3. The combination of claim 2, further comprising at least one additional clip received in another of said grooves.

4. The combination of claim 3, and further including a panel lockingly engaged with the panel interface members of each of said clips.

5. The clip of claim 1, wherein said means for engaging a panel includes a projection extending generally perpendicularly from a first of said panel interface members in a direction of a second of said panel interface members, and said second panel interface member including a recess to accommodate said projection.

6. The clip of claim 5, in combination with a panel having an aperture therein to receive said projection of the first panel interface member.

7. The clip of claim 5, wherein said first and second panel interface members extend perpendicular to the axis defined by said pole receiving member.

8. The clip of claim 5, further including an arcuate wall member adjoining said first panel interface member, said arcuate wall member located on a side of said first panel interface member opposite from said projection, and said arcuate wall member extending from the exterior of said pole receiving member to the distal end of said first panel interface member.

9. The clip of claim 8, wherein said arcuate wall member and said first panel interface member define a generally D-shaped leg of said clip, the interior of said D-shaped leg including a webbed wall therein.

10. The clip of claim 9, further including a webbed flange extending between said exterior of the pole interface member and a side of said second panel interface member opposite said recess.

11. The clip of claim 10, wherein said flange biases said distal end of the second panel interface member toward said distal end of the first panel interface member.

12. The clip of claim 5, wherein said projection has an inclined leading edge that starts flush with said first panel interface member at a point closest to the distal end of said first panel interface member to facilitate insertion of a panel between said first and second panel interface members.

13. A clip for attaching panels to indexed poles comprising:
   a substantially C-shaped pole engaging member having an interior, an exterior, a first end, a second end, said first and second ends defining an opening to receive a pole, and an inwardly-directed medial ridge extending substantially from said first end to said second end on the interior thereof;
   a first leg portion extending in a first direction from the exterior of the C-shaped pole engaging member, said first leg portion being substantially D-shaped and having a first panel interface member;
   a second leg portion extending in said first direction from the exterior of the C-shaped pole engaging member, said second leg portion including a second panel interface member parallel to said first panel interface member and a webbed flange on a side of the second panel interface member opposite said first panel interface member; and
   means for securing a panel between said first and second panel interface members.

14. The clip of claim 13, wherein said means comprises a projection of said first panel interface member in a direction toward said second panel interface member and a recess in said second panel interface member to receive said projection.

15. The clip of claim 14, wherein said projection is provided with means to facilitate installation of a panel between said first and second panel interface members without the use of tools.

16. The clip of claim 15, wherein said means to facilitate installation of a panel between said first and second panel interface members comprises an inclined surface of said projection, said inclined surface being sloped downwardly toward a distal end of each of the panel interface members to direct said panel toward the recess of said second panel interface member.

17. The clip of claim 13, wherein said clip is formed as a unitary member.

* * * * *